Figure 1:
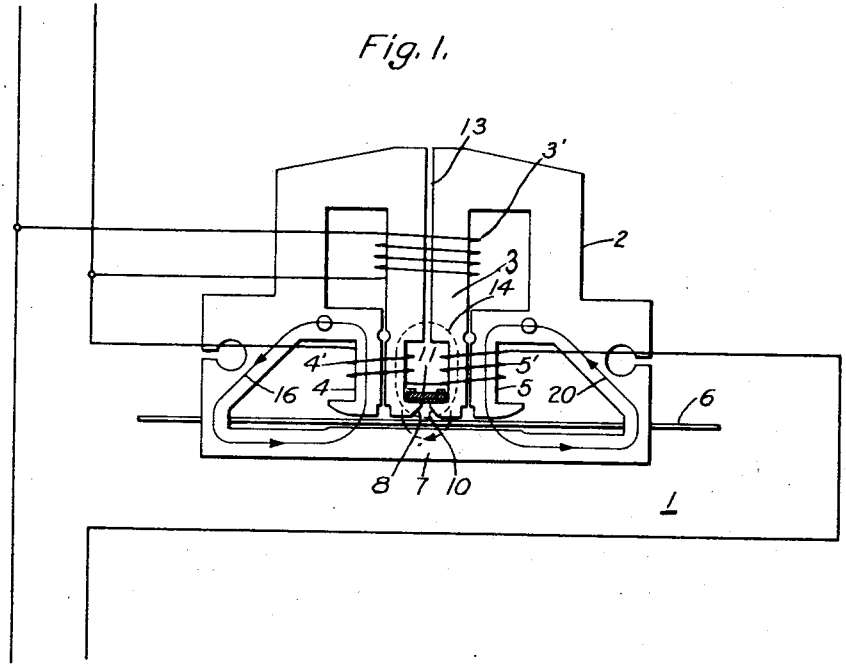

Aug. 20, 1929.  W. M. BRADSHAW  1,725,051

INDUCTION WATT HOUR METER

Filed April 29, 1927

WITNESSES:
Fred C. Wilharm
B. Q. King

INVENTOR
William M. Bradshaw
BY
Wesley G. Barr
ATTORNEY

Patented Aug. 20, 1929.

1,725,051

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

INDUCTION WATT HOUR METER.

Application filed April 29, 1927. Serial No. 187,444.

My invention relates to electrical measuring instruments and more particularly to the class of electrical measuring instruments that operate on the induction principle.

My invention has for an object to provide means for improving the overload characteristics of an induction watthour meter.

Another object of my invention is to provide means for improving the operation of a watthour meter over its entire range of load.

A further object of my invention is to provide a watthour meter that shall be characterized by simplicity and efficiency in both construction and operation.

These and other useful and desirable objects will be explained and set forth more in detail in the following description.

It is a well known fact that as the load of a watthour meter increases, that is, as the current traversing the load coils of the meter increases the armature turns not at a speed proportional to the product of the voltage and current of the potential and current coils, but rotates at a speed somewhat less than the speed at which it should rotate. The current coils produce a dampening flux which traverses the armature and retards its motion in a manner similar to the retardation effected by the drag magnet which latter is substantially proportional to the square of the dampening flux.

Such a dampening effect, at the higher loads of the meter, causes a distinct droop in the registration-load curve of induction watthour meters. Up to about 250% full load the curve is for all practical purposes a straight line, but at about 300% full load the registration curve falls off rapidly and soon reaches a point with an increase in load, at which, the meter registers less than the load traversing its actuating coils.

I materially overcome the above disadvantage by causing a large portion of the torque producing flux to be shunted from the path of the armature at the higher values of load, and in increasing the torque producing flux at a greater ratio than the increase in the current flux, at the higher values of load. For example, by making the torque producing flux traversing the armature at about 300% load on the meter more than three times as great as it was with 100% load on the meter the armature is caused to rotate at a greater speed than it would rotate were the active flux exactly three times as great as with 100% load on the meter with the current flux dampening the armature.

I accomplish such result by slotting out a portion of the laminations in the flux path and in placing a magnetic shunt between the electromagnet poles near the armature. The air gap formed by slotting the electromagnetic core co-operates with the shunt to cause the torque producing flux turning the armature to increase at a ratio at variance with the ratio of the self dampening flux to compensate rotation of the armature therefor.

Figure 2:

My invention may be more readily understood by reference to the accompanying drawings, in which Fig. 1 is a view in elevation of a portion of an induction meter constructed in accordance with my invention, and Fig. 2 is a view of an enlarged section of a shunt used in connection with my invention.

In Fig. 1 an induction meter 1 having integrating and structural portions removed for purposes of clearness comprises in general, an electromagnetic core 2 having a central portion 3 adapted to form the core for a voltage coil 3' and two similar sections 4 and 5 for current coils 4' and 5' of the meter. The interaction, resulting from the flux emanating from the voltage section 3 and the current sections 4 and 5, rotates a disc 6 that turns in the air gap between a lower section 7 of the electromagnetic core 2 and the current sections 4 and 5. The inner portions of the sections 4 and 5 are provided with projections or pole tips 8, and 10, which support a magnetic shunt 11 partially enclosed in a non-magnetic casing 12. The casing 12 may be of any non-magnetic material, but in practicing my invention I prefer that it shall be constructed of bronze, also the shunt 11 is preferably constructed of iron or an alloy having iron forming a portion thereof. The central section 3 is provided with a slot 13 in its central portion extending laterally through its entire length. This slot constitutes an air gap that co-operates with the shunt 11 to cause the active flux turning the disc 6 to actuate the latter to compensate for the self-dampening of the current flux at overloads of say about 300% of full load.

The current or series flux traverses a path in the portion 3 and the outer portion of the core 2 substantially as shown by the dotted line 14 and the solid lines 16 and 20. At the lower values of load on the meter a substantially great portion of the flux is shunted out of the disc air gap by the shunt 11, but at over loads shunt 11 becomes saturated and increases the magneto-motive force drop between the pole tips 8 and 10 on each side of the shunt 11. A saturation of the pole tips 8 and 10 takes place and a larger portion of the total torque producing flux is forced through the disc armature 6. Such action increases the percentage of the active flux that traverses a path shown by the lower portion of the dotted lines 14.

The flux actuating the disc 6 is thus increased at a greater ratio than the increase in the ratio of the self-dampening flux. In such a manner the disc rotates at a speed substantially proportional to the product of the current and voltage at the higher values of load. The air gap 13 co-operates with the shunt 11 to compensate for the self-dampening caused by the current flux and results in an improved overload characteristic, that is the droop in the characteristic curve at overloads is substantially straightened out.

The air gap 13 also performs a very important function at light values of load. The air gap 13 prevents the current flux from being shunted through shunt 11 from the disc 6 at extremely light loads. At light loads the flux takes a path as indicated by the solid lines 16 and 20 around the outer portion of the electromagnetic core 2 because these paths have a lower magnetic resistance than the path 14. At light loads, therefore, the flux traversing the paths 16 and 20 turns the disc 6 substantially in accordance with the energy traversing the actuating windings of the motor.

In Fig. 2 an enlarged esction of the shunt 11 is shown with casing 12 enclosing its end portions.

In practicing my invention the shunt 11 could be entirely eliminated and an action similar to the action produced by it could be obtained by extending the tips 8 and 10 together, in such manner that they perform the same function as the shunt 11.

The flux which takes a path shown by the solid lines 16 and 20, causes a desirable distribution of the flux from the current and voltage coils at both light loads and other loads. Such distribution causes the self-dampening to decrease and as the permanent dampening remains the same, the changeable part of the dampening is a smaller percentage which results in a smaller droop in the registration curve at overload.

The air gap 13 performs two functions. First it co-operates with the shunt 11 to cause an improvement in the overload characteristic of the meter by causing the active flux traversing the disc to increase at a rate substantially necessary to compensate for the rate at which the dampening flux increases, as pointed out above. Second, it causes an improvement in the operation of the meter at light loads by making the shunt 11 ineffective at light loads. This latter action may be explained by reference to the lines 16 and 20 representing the flux traversing the outer portion of the core 2. Were it not for the air gap 13, at light loads, the outer flux would traverse the shunt 11 at these lower values and substantially no flux would traverse the air gap in which the disc 6 is disposed. However, by slotting the section 3 to form the air gap 13 the magnetic resistance of the path 14 is increased to such an extent that the active flux at light loads takes a path corresponding to lines 16 and 20. It is thus seen that the air gap 13 causes an improvement in the operation of the meter in conjunction with the shunt 11 at both light loads and increasing loads.

It is important that the air gap 13 be in such a position in the electromagnet core 2 that the active flux, at light loads, will be forced to take a path through the disc armature and not through the shunt 11. At the higher values of load the shunt 11 co-operates with the air gap 13 to force active flux through the disc 6 at an increasing rate.

While I have shown a particular core structure in connection with my invention, it will be understood that any core structure designed to perform a similar function is included within the scope of my invention.

I desire to include all such modifications as are in the spirit and scope of the appended claims.

I claim as my invention:

1. An induction meter comprising a core of magnetizable material having a voltage portion and a current portion, an armature, means for energizing the voltage and current portions to produce fluxes to turn said armature, means for causing the armature to turn substantially in accordance with the true energy traversing said energizing means comprising a shunt for causing one of said fluxes to traverse the armature at an increasing rate upon an increase of said energizing means, and means including a non-magnetic area in said voltage portion in the path of the flux produced by said current portion for making said shunt substantially inoperative at light loads.

2. An induction meter comprising an electro-magnetic core having an upper slotted central portion and a plurality of lower portions, means for energizing the upper and lower portions in accordance with the energy of an electric circuit, a magnetic shunt between the lower portions, an armature disposed in an air gap in the electromagnet core, the upper slotted central portion co-operating with the said shunt to cause the armature to rotate substantially in accordance with the power traversing the circuit at all loads including both light loads and over loads.

3. An induction meter for measuring the magnitude of a quantity traversing an electric circuit, comprising an electromagnet of substantially the shape of a hollow rectangle having inwardly and downwardly extending central portions for windings, said electromagnet having an air gap, an armature disposed in said air gap, means including a magnetic shunt for deflecting the flux from the armature at predetermined loads, and means including an air gap for making the shunt substantially inoperative at light loads and for co-operating with the shunt at increasing loads.

4. An induction watthour meter for measuring the energy traversing an electric circuit comprising an electromagnet having current and voltage fluxes, an armature rotated by said fluxes, said electromagnet having an air gap, a magnetic shunt in series with said air gap and adjacent said armature, said air gap causing said shunt to be substantially inoperative at light loads and cooperating with the shunt at loads above full load to improve the registration of the meter.

5. In an electrical measuring instrument having an electromagnet provided with a plurality of sections for current and voltage windings, and an armature for turning in accordance with the amperes and the volts in said current and voltage windings, of means including a non-magnetic area in the voltage section for forcing an active flux through the armature at light loads and a magnetic shunt for deflecting flux through the armature at an increasing rate at loads above full load.

6. An induction meter comprising a core of magnetizable material having a voltage portion and a current portion, an armature, means for energizing said current and voltage portions to turn said armature, and means for causing said armature to turn substantially in accordance with the magnitude of said energizing means comprising a magnetizable shunt and an air gap associated therewith, said air gap making said shunt substantially inoperative at relatively light loads and co-operating therewith at increasing loads to compensate said armature for series damping.

7. An induction meter comprising a core of magnetizable material having a voltage portion and a current portion, an armature, means for energizing said current and voltage portions to turn said armature, and means for causing said armature to turn substantially in accordance with the magnitude of said energizing means comprising a detachable magnetizable shunt and an air gap associated therewith, said air gap making said shunt substantially inoperative at relatively light loads and co-operating therewith at increasing loads to compensate said armature for series damping.

8. The combination with a magnetizable structure comprising pole-portion structure for a voltage winding, spaced pole-portion structures for a current winding, and a member cooperating with said last named pole-portion structures to form a flux gap, of a movable armature in said flux gap, all of said pole-portion structures being on one side of said armatures, said first named pole-portion structure having a non-magnetic area for improving the distribution of flux from said current winding in said flux gap.

9. The combination with a magnetizable structure comprising pole-portion structure for a voltage winding, spaced pole-portion structures for a current winding, and a member cooperating with said last named pole-portion structures to form a flux gap, of a movable armature in said flux gap, all of said pole-portion structures being on one side of said armature, said voltage pole-portion structure having an air gap for improving the accuracy of registration of said armature.

10. The combination with a magnetizable structure comprising pole-portion structure for a voltage winding, spaced pole-portion structures for a current winding, and a member cooperating with said last named pole-portion structures to form a flux gap, of a movable armature in said flux gap, all of said pole-portion structures being on one side of said armature, said magnetizable structure having an air gap therein for limiting the flux of said current winding traversing said voltage pole-portion structure whereby the distribution of flux in the armature flux gap is changed.

11. The combination with a magnetizable structure comprising pole-portion structure for a voltage winding, spaced pole-portion structures for a current winding, and a member cooperating with said last named pole-portion structures to form a flux gap, of a movable armature in said flux gap, all of said pole-portion structures being on one side of said armature, a shunt member coacting with said spaced pole-portion structures, said voltage pole portion structure having a flux gap therein, said shunt member and said flux gap cooperating to compensate said armature at both light and overloads.

12. The combination with a magnetizable structure comprising pole-portion structure for a voltage winding, spaced pole-portion structures for a current winding, and a member cooperating with said last named pole-portion structures to form a flux gap, of a movable armature in said flux gap, all of said pole-portion structures being on one side of said armature, and means for improving the use of said magnetizable structure comprising a magnetizable member bridging said current winding pole-portion structures, and said pole-portion structure for said voltage winding having an air gap separating it longitudinally of said winding.

In testimony whereof, I have hereunto subscribed my name this 25th day of April, 1927.

WILLIAM M. BRADSHAW.